United States Patent
DeRosa-Grund (10) Patent No.: US 11,636,195 B2
(45) Date of Patent: Apr. 25, 2023

(54) DYNAMIC BIOMETRIC IDENTITY VERIFICATION SYSTEM, METHOD AND DEVICE

(71) Applicant: Atrium Separate IP Holdings Number 1, LLC, Sheridan, WY (US)

(72) Inventor: H. Anthony DeRosa-Grund, Magnolia, TX (US)

(73) Assignee: Atrium Separate IP Holdings Number 4, LLC, Sheridan, WY (US)

( * ) Notice: Subject to any disclaimer, the term of this patent is extended or adjusted under 35 U.S.C. 154(b) by 277 days.

(21) Appl. No.: 17/025,924

(22) Filed: Sep. 18, 2020

(65) Prior Publication Data
US 2021/0089640 A1     Mar. 25, 2021

Related U.S. Application Data (60) Provisional application No. 62/982,517, filed on Feb. 27, 2020, provisional application No. 62/902,456, filed on Sep. 19, 2019.

(51) Int. Cl.
| | | |
|---|---|---|
| G06F 21/40 | (2013.01) | |
| G10L 15/22 | (2006.01) | |
| G06V 30/413 | (2022.01) | |
| G06V 40/40 | (2022.01) | |
| G06V 40/16 | (2022.01) | |
| G06V 40/12 | (2022.01) | |

(52) U.S. Cl.
CPC .......... *G06F 21/40* (2013.01); *G06V 30/413* (2022.01); *G06V 40/1365* (2022.01); *G06V 40/167* (2022.01); *G06V 40/40* (2022.01); *G10L 15/22* (2013.01)

(58) Field of Classification Search
CPC ....... G06F 21/40; G06F 21/32; G06V 30/413; G06V 40/1365; G06V 40/167; G06V 40/40; G06V 10/80; G10L 15/22; G06K 9/6288

See application file for complete search history.

(56) References Cited

U.S. PATENT DOCUMENTS 10,521,780 B1   12/2019  Hopkins, III
11,049,128 B1    6/2021  Olson
(Continued)

OTHER PUBLICATIONS

Johnson, R. C., Scheirer, W. J., & Boult, T. E. (May 2013). Secure voice-based authentication for mobile devices: vaulted voice verification. In Biometric and Surveillance Technology for Human and Activity Identification X (vol. 8712, pp. 164-176). SPIE. (Year: 2013).*
(Continued)

*Primary Examiner* — Edward F Urban
*Assistant Examiner* — Wassim Mahrouka
(74) *Attorney, Agent, or Firm* — Haverstock & Owens, A Law Corporation (57) ABSTRACT

A dynamic biometric identity verification system for verifying an identity of a person. The system includes an identity verification device and a biometric data memory storing an identification pair including an identifier and biometric data of the person. The identification verification device using the biometric data to verify the identity of the person, effectuating a proof-of liveness test and requirement, by dynamically generating and/or selecting challenge questions and comparing answers to those questions with the stored biometric data.

34 Claims, 4 Drawing Sheets

(56) References Cited

U.S. PATENT DOCUMENTS

| | | |
|---|---|---|
| 2016/0092988 A1 | 3/2016 | Letourneau |
| 2017/0048230 A1* | 2/2017 | Johansson ............. H04L 63/083 |
| 2017/0300872 A1 | 10/2017 | Brown |
| 2017/0352012 A1 | 12/2017 | Hearn |
| 2018/0323963 A1 | 11/2018 | Stollman |
| 2019/0026821 A1 | 1/2019 | Bathen |
| 2019/0034975 A1 | 1/2019 | Rizk |
| 2019/0130416 A1 | 5/2019 | Boudville |
| 2019/0220603 A1 | 7/2019 | Gopalakrishnan |
| 2019/0251527 A1 | 8/2019 | Surdak |
| 2019/0340623 A1 | 11/2019 | Rivkind |
| 2019/0363890 A1 | 11/2019 | Johnson |
| 2019/0370866 A1 | 12/2019 | Lawbaugh |
| 2019/0385215 A1 | 12/2019 | Ferenczi |
| 2020/0042773 A1* | 2/2020 | Benkreira ............. G06V 20/62 |
| 2020/0051041 A1 | 2/2020 | Ko |
| 2020/0058023 A1 | 2/2020 | Travizano |
| 2020/0065922 A1 | 2/2020 | Goldstraj |
| 2020/0175003 A1 | 6/2020 | Jiang |
| 2020/0186962 A1 | 6/2020 | Moeller |
| 2020/0210413 A1 | 7/2020 | Quick |
| 2020/0242595 A1 | 7/2020 | Harrison |
| 2020/0267163 A1 | 8/2020 | Wilson |
| 2020/0320220 A1 | 10/2020 | Beno |
| 2021/0049608 A1 | 2/2021 | Fang |
| 2021/0182423 A1 | 6/2021 | Padmanabhan |
| 2022/0123945 A1 | 4/2022 | Yang |

OTHER PUBLICATIONS

Chang, Y. T., & Dupuis, M. J. (Aug. 2009). My voiceprint is my authenticator: A two-layer authentication approach using voiceprint for voice assistants. (Year: 2019).*

* cited by examiner

DYNAMIC BIOMETRIC IDENTITY VERIFICATION SYSTEM, METHOD AND DEVICE

RELATED APPLICATIONS

This patent application claims priority under 35 U.S.C. § 119(e) of the U.S. Provisional Patent Application No. 62/902,456, filed Sep. 19, 2019, entitled "ENTERPRISE GRADE DATABASE AND TRANSACTION PLATFORM WITH CONTINUOUS, AUTOMATED WORLDWIDE DATA PRIVACY LAW COMPLIANCE," and U.S. Provisional Patent Application No. 62/982,517, filed Feb. 27, 2020, entitled "ENTERPRISE GRADE DISTRIBUTED DATA STORAGE AND TRANSACTION PLATFORM WITH CONTINUOUS, AUTOMATED WORLDWIDE DATA PRIVACY LAW AND REGULATORY LAW COMPLIANCE, IMPERVIOUS TO CYBER ATTACKS AND UTILIZING AN AI/MACHINE LEARNING BIOMETRIC SECURITY LOCK WITH A PROOF OF LIVENESS TEST FOR ID AND ACCESS," both of which are hereby incorporated by reference.

FIELD OF THE INVENTION

The present invention relates to the field of identity verification. More particularly, the present invention relates to dynamic biometric identity verification.

BACKGROUND OF THE INVENTION

The use of biometrics to enhance security is increasing rapidly in recent years. The term biometrics refers to the measurement of one or more a living traits or personal characteristics of a person, such as a fingerprint, a voice print, an iris scan, facial authentication, or any other characteristic unique to the individual. These biometrics are more and more often being used to control access. For example, numerous technologies are being developed and implemented that interpret personal traits or biometric information for access control purposes in place of more easily fooled identification systems such as those based solely on entry of a password. Unfortunately, existing biometric-based security systems have not provided the high levels of accuracy and ease of use that is demanded by users of such systems.

SUMMARY OF THE INVENTION

A dynamically updating biometric identity verification system for verifying an identity of a person with proof of liveness. The system includes an identity verification device and a biometric data memory storing an identification pair including an identifier and biometric data of the person. The identification verification device using the biometric data to verify the identity of the person by dynamically generating and/or selecting instant challenge questions, in real-time, requiring immediate answers to those questions and then comparing answers to those questions with the stored biometric data.

A first aspect is directed to a dynamic biometric identity verification system for verifying an identity of a person. The system comprises a non-transitory computer-readable biometric data memory storing an identification pair including an identifier and biometric data of the person, the biometric data including reference audio data of the person saying a list of one or more of a plurality of target words and a verification device including a processor and a non-transitory computer-readable memory storing an identity verification module that when executed by the processor causes the verification device to receive an identification request from the person, the identification request indicating the identifier of the person, access the biometric data memory and identify the biometric data of the person based on the identifier of the person indicated by the identification request, select one or more selected words of the list, determine a selected challenge question based on the selected words, the selected challenge question having a correct answer and at least one of the selected challenge question and the correct answer including the selected words, present the selected challenge question to the person, receive response audio data in response to the selected challenge question and indicate that the person corresponds to the identifier based on the response audio data including the selected words and portions of the response audio data that include the selected words matching portions of the reference audio data that include the selected words and the response audio data including the correct answer.

In some embodiments, the system further comprises a non-transitory computer-readable challenge repository storing a plurality of challenge questions including the selected challenge question, wherein the challenge questions are each paired with one or more answers, wherein each of the challenge questions has at least one characteristic of a group of characteristics comprising the challenge question comprises one or more of the target words and the answers to the challenge question comprise one or more of the target words. In some embodiments, each of the answers is a sentence including the one or more of the target words. In some embodiments, the selected challenge question is a fill in a blank question with the blank being one of the selected words. In some embodiments, when executed by the processor the identity verification module causes the verification device to begin a timer when presenting the selected challenge question to the person and indicate that the identity of the person could not be verified if the response audio data is received after a predetermined amount of time has elapsed since the timer was began.

In some embodiments, when executed by the processor the identity verification module causes the verification device to remove the selected words from the list after the selected words have been used to verify if the person corresponds to the identifier, based on determining that the person corresponds to the identifier, add to the list one or more words forming the correct answer in the response audio data that are not the selected words and store parts of the response audio data including the one more words added to the list in the biometric data memory with the reference audio data of the person. In some embodiments, the biometric data includes reference video data of the person saying the list of one or more of the plurality of target words. In some embodiments, when executed by the processor the identity verification module causes the verification device to receive response video data in response to the selected challenge question, and further wherein the indicating that the person corresponds to the identifier is also based on the response video data including the person saying the selected words and the portions of the response video data that include the person saying the selected words matching portions of the reference video data that include the selected words.

In some embodiments, when executed by the processor the identity verification module causes the verification device to generate the identification pair by receiving image data of an identification card and parsing a card facial image and text from the identification card based on the image data, generating and storing the identifier based on the text parsed from the identification card, input live facial image data of the person using a camera of the identity verification device, determine if the live facial image data matches the card facial image and inputting and storing the biometric data of the identification pair based on the live facial image matching the facial image. In some embodiments, the verification device is a server and the identity verification module is a part of a website operated by the server. In some embodiments, the verification device is a local device and the identity verification module is a part of an application downloaded onto the local device.

A second aspect is directed to a dynamic biometric identity verification device for verifying an identity of a person, the person associated with an identification pair stored on a biometric data memory and including an identifier and biometric data of the person, the biometric data including reference audio data of the person saying a list of one or more of a plurality of target words. The device comprises a processor and a non-transitory computer-readable device memory storing an identity verification module that when executed by the processor causes the identity verification device to receive an identification request from the person, the identification request indicating the identifier of the person, access the biometric data memory and identify the biometric data of the person based on the identifier of the person indicated by the identification request, select one or more selected words of the list, determine a selected challenge question based on the selected words, the selected challenge question having a correct answer and at least one of the selected challenge question and the correct answer including the selected words, present the selected challenge question to the person, receive response audio data in response to the selected challenge question and indicate that the person corresponds to the identifier based on the response audio data including the selected words and portions of the response audio data that include the selected words matching portions of the reference audio data that include the selected words and the response audio data including the correct answer.

In some embodiments, the device further comprises a non-transitory computer-readable challenge repository storing a plurality of challenge questions including the selected challenge question, wherein the challenge questions are each paired with one or more answers, wherein each of the challenge questions has at least one characteristic of a group of characteristics comprising the challenge question comprises one or more of the target words and the answers to the challenge question comprise one or more of the target words. In some embodiments, each of the answers is a sentence including the one or more of the target words. In some embodiments, the selected challenge question is a fill in a blank question with the blank being one of the selected words. In some embodiments, when executed by the processor the identity verification module causes the verification device to begin a timer when presenting the selected challenge question to the person and indicate that the identity of the person could not be verified if the response audio data is received after a predetermined amount of time has elapsed since the timer was began.

In some embodiments, when executed by the processor the identity verification module causes the verification device to remove the selected words from the list after the selected words have been used to verify if the person corresponds to the identifier, based on determining that the person corresponds to the identifier, add to the list one or more words forming the correct answer in the response audio data that are not the selected words and store parts of the response audio data including the one more words added to the list in the biometric data memory with the reference audio data of the person. In some embodiments, the biometric data includes reference video data of the person saying the list of one or more of the plurality of target words. In some embodiments, when executed by the processor the identity verification module causes the verification device to receive response video data in response to the selected challenge question, and further wherein the indicating that the person corresponds to the identifier is also based on the response video data including the person saying the selected words and the portions of the response video data that include the person saying the selected words matching portions of the reference video data that include the selected words.

In some embodiments, when executed by the processor the identity verification module causes the verification device to generate the identification pair by receiving image data of an identification card and parsing a card facial image and text from the identification card based on the image data, generating and storing the identifier based on the text parsed from the identification card, input live facial image data of the person using a camera of the identity verification device, determine if the live facial image data matches the card facial image and inputting and storing the biometric data of the identification pair based on the live facial image matching the facial image. In some embodiments, the device memory comprises the biometric data memory and the identity verification module is a part of a website. In some embodiments, the device further comprises a display that displays the selected challenge question, a microphone that receives the response audio data and a camera for receiving live facial image data.

A third aspect is directed to a method of verifying an identity of a person. The method comprises receiving an identification request from the person with a verification device, the identification request indicating the identifier of the person, accessing biometric data memory with the identity verification device, the biometric data memory storing an identification pair including an identifier and biometric data of the person, the biometric data including reference audio data of the person saying a list of one or more of a plurality of target words, identifying the biometric data of the person with the identity verification device based on the identifier of the person indicated by the identification request, selecting one or more selected words of the list with the identity verification device, determining a selected challenge question with the identity verification device based on the selected words, the selected challenge question having a correct answer and at least one of the selected challenge question and the correct answer including the selected words, presenting the selected challenge question to the person with the identity verification device, receiving response audio data with the identity verification device in response to the selected challenge question and indicating with the identity verification device that the person corresponds to the identifier based on the response audio data including the selected words and portions of the response audio data that include the selected words matching portions of the reference audio data that include the selected words and the response audio data including the correct answer.

In some embodiments, the method further comprises accessing a non-transitory computer-readable challenge repository with the identity verification device, the challenge repository storing a plurality of challenge questions including the selected challenge question, wherein the challenge questions are each paired with one or more answers, wherein each of the challenge questions has at least one characteristic of a group of characteristics comprising the challenge question comprises one or more of the target words and the answers to the challenge question comprise one or more of the target words. In some embodiments, each of the answers is a sentence including the one or more of the target words. In some embodiments, the selected challenge question is a fill in a blank question with the blank being one of the selected words. In some embodiments, the method further comprises beginning a timer with the identity verification device when presenting the selected challenge question to the person and indicating with the identity verification device that the identity of the person could not be verified if the response audio data is received after a predetermined amount of time has elapsed since the timer was began.

In some embodiments, the method further comprises removing the selected words from the list with the identity verification device after the selected words have been used to verify if the person corresponds to the identifier, based on determining that the person corresponds to the identifier, adding to the list with the identity verification device one or more words forming the correct answer in the response audio data that are not the selected words and storing with the identity verification device parts of the response audio data including the one more words added to the list in the biometric data memory with the reference audio data of the person. In some embodiments, the biometric data includes reference video data of the person saying the list of one or more of the plurality of target words. In some embodiments, the method further comprises receiving with the identity verification device response video data in response to the selected challenge question, wherein the indicating that the person corresponds to the identifier is also based on the response video data including the person saying the selected words and the portions of the response video data that include the person saying the selected words matching portions of the reference video data that include the selected words.

In some embodiments, the method further comprises generating the identification pair with the identity verification device by receiving image data of an identification card and parsing a card facial image and text from the identification card based on the image data, generating and storing the identifier based on the text parsed from the identification card, input live facial image data of the person, determine if the live facial image data matches the card facial image and inputting and storing the biometric data of the identification pair based on the live facial image matching the facial image. In some embodiments, the identity verification device comprises the biometric data memory. In some embodiments, the identity verification device displays the selected challenge question with an electronic display screen, receives the response audio data with a microphone and receives live facial image data with a camera.

DETAILED DESCRIPTION OF THE INVENTION

Embodiments described herein are directed to a dynamic biometric identity verification system, method and device for verifying an identity of a person. The system, method and device includes an identity verification device and a biometric data memory storing an identification pair including an identifier and biometric data of the person. The identification verification device using the biometric data to verify the identity of the person by dynamically generating and/or selecting challenge questions and comparing answers to those questions with the stored biometric data. As a result, the system, method and device provides the advantage of dynamically generated and/or selected biometric based questions that cannot be determined ahead of time by a bad actor trying to trick the system. Further, by requiring both correct answers in substance as well as the use of matching biometric data used to form those answers, the system, method and device provides the advantage of a dual layer of identity verification and proof-of-liveness where the biometric content needed cannot be anticipated and thus must be produced dynamically at the correct time and in the correct order.

Figure 1:
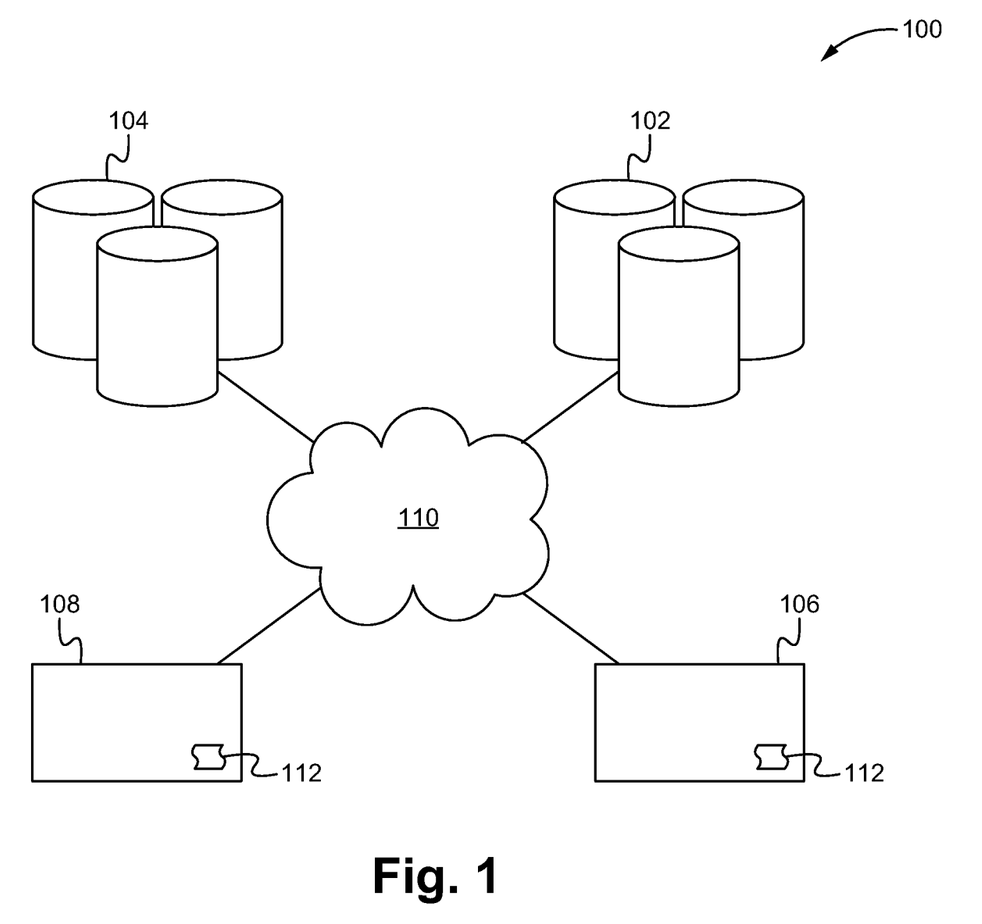
FIG. 1 illustrates a dynamic identity verification system according to some embodiments.

FIG. 1 illustrates a dynamic identity verification system 100 according to some embodiments. As shown in FIG. 1, the system 100 comprises a biometric data repository 102, a challenge question repository 104, one or more local devices 106 (e.g. user device) and one or more network devices 108 all operatively coupled together via one or more networks 110. The networks 110 are able to be one or a combination of wired or wireless networks as are well known in the art. Although FIG. 1 illustrates a single biometric data repository 102, challenge question repository 104, local device 106 and network device 108, it is understood that the system 100 is able to comprise more or less biometric data repositories 102, challenge question repositories 104, local devices 102 and/or network devices 106 coupled together via the network 108. For example, in some embodiments one or more of the challenge question repository 104, the local device 106 and/or the network device 108 are able to be omitted from the system 100.

In some embodiments, the network device 108 includes an identity verification application 112 stored on a memory of the device 108. In such embodiments, the network device 108 is able to implement the functions of the application 112 as a website, portal, platform and/or networked service operated by the network device 108. Also in such embodiments, the local device 106 is able either to omit storage/local execution of the verification application 112 and access the website/application 112 over the network 110 (e.g. using a web browser), or to locally store some or all of the application 112 on the device 106 with execution of the application's functions being divided between locally on the local device 106 and remotely from the network device 108. For example, the local device 106 is able to not store any of the application 112 and instead only serve to access the application 112 via a network browser and the network 110 (with the application 112 on the network device 108 optionally accessing and using components of the local device 106 such as a microphone and/or camera). As another example, the local device 106 is able to store some or all of the application 112 such that it is able to be at least partially executed locally, but must access and/or communicate with the application 112 stored on the networked device 108 in order to fully operate.

Alternatively, the network device 108 is able to be omitted and the application 112 is able to be fully stored and operate solely on a memory of the local device 106. For example, the application 112 is able to be a downloadable application that is downloaded onto the local device 106 and only needs to access the repositories 102, 104 (either remotely or locally) in order to provide the functions described herein. Similarly, alternatively the local device 106 is able to be omitted and the application 112 is able to be fully stored and operate solely on the memory of the network device 108. For example, the network device 108 is able to be a stationary access terminal (e.g. security door) that locally operates the application 112 and includes a user interface and/or other components (e.g. microphone, display, camera, or other peripheral components) that enables the user to interact with the application 112.

Accordingly, it is noted that although the operation of the system 100 and application 112 is described herein according to an exemplary functional distributions between the local device 106 and the network device 108 for the sake of brevity, it is understood that other permutations of functional distributions between the devices 106, 108 are contemplated.

The local device 106 and the network device 108 are each able to comprise a processor, a local memory and an identity verification application 112 stored on the local memory for execution by the processor. In addition, the local device 106 is able to comprise one or more of a screen/display, a microphone, a camera and a graphical user interface that are controllable and/or accessible by the application 112 (either locally on the local device 106, remotely from the network device 108 or both). As a result, regardless of whether the application 112 is executed solely on the local device 106 or the network device 108 (and/or if its functions/execution is distributed between the network device 108 and the local device 106), the application 112 is able to use the services/components of the local device 106. In some embodiments, the local device 106 is one or more of a personal computer, a laptop computer, a computer workstation, a server, a mainframe computer, a handheld computer, a personal digital assistant, a cellular/mobile telephone, an IOT device, a smart appliance, a game console, a digital camera, a digital camcorder, a camera phone, a smart phone, smart jewelry (e.g., smartwatch), a portable music player, a tablet computer, a mobile device, a video player, a video disc writer/player (e.g., DVD writer/player, high definition disc writer/player, ultra-high definition disc writer/player), a television, a home entertainment system or any other suitable computing device. In some embodiments, the network device 108 is one or more of a server, a cloud server, a cluster of servers implementing a blockchain and/or other network electronic devices.

Although they are shown as separate single repositories 102, 104 in FIG. 1, the challenge question repository 104 and the biometric data repository 102 are able to be combined into a single repository of non-transitory computer-readable media or one or both are able to be individually divided into multiple smaller repositories. In some embodiments, the repositories 102, 104 are both separate from the devices 106, 108 as shown in FIG. 1. Alternatively, in some embodiments the challenge question repository 104 and/or the biometric data repository 102 are able to be integrated into one or both of the devices 106, 108. For example, the challenge question repository 104 and/or the biometric data repository 102 is able to be a part of the memory of the network device 108, a part of the memory of the local device 106, or a part of both the memory of the network device 108 and the local device 106. If a part of both, the repository 102, 104 is able to be fully stored on each of the devices 106, 108, fully stored on one of the devices 106, 108 and partially stored on the other, or partially stored on each of the devices 106, 108 (wherein the parts together form the entire repository).

In some embodiments, the challenge question repository 104 and/or the biometric data repository 102 are able to be micro-identification chain (MIDC) arrays, also referred to as a Chain Arrayed Data Store. The details of MIDC arrays are found in U.S. patent application Ser. No. 16/855,918, filed Apr. 22, 2020, and entitled "A BLOCKCHAIN ARCHITECTURE, SYSTEM, METHOD AND DEVICE FOR AUTOMATED CYBERSECURITY AND DATA PRIVACY LAW COMPLIANCE WITH DELAYED BLOCK POSTING PROTOCOL," which is hereby incorporated by reference. Specifically, MIDC arrays are able to comprise one or more stacked MIDCs such that the blocks of the MIDCs are each a cell of the array with each MIDC being a row of the array and the aligned cells of different rows forming the columns of the array. Alternatively, the challenge question repository 104 and/or the biometric data repository 102 are able to be databases (e.g. distributed or centralized databases) storing, updating and/or maintaining the data described herein.

The biometric data repository 102 is able to store, update and/or maintain personal data about one or more registered persons whose identity is able to be verified by the system 100. The personal data (PPI) for each person is able to comprise a unique identifier of the person paired with a target word set, an identity and biometric data of the identity/person. The unique identifier is able to comprise a name, social security number, username/password, driver's license number, alphanumeric code/string (optionally assigned by the application 112), date of birth, height, weight, sex, security questions/answers, account number or a combination and/or mathematical modulation thereof. The identity is able to be an officially backed identity with an associated facial image and/or other data. For example, the identity is able to be the image and data found on a driver's license or passport or other government/company issued identification document/card. The target word set is able to be a list of target words whose biometric characteristics (such as audio and/or video of them being spoken by the person identified by the identifier) are a part of the biometric data described below. Specifically, when the audio and/or video of the person speaking a word is added to the biometric data, that word is able to be added to the target word set (such that it and the biometric data can be used for identity verification in the process described below). This target word set is able to be updated by the data management module of application 112 by adding words each time the associated biometric data is captured (e.g. during the verification process) and/or selectively removing words.

For example, the application 112 is able to remove words (and/or the associated biometric data) that have been used in a previous verification process once (or a set number of times). Alternatively, the words (and/or the associated biometric data) are able to not be removed even after being used in a previous verification process once (or the set number of times), and instead the application 112 is able to just mark those words as unusable in the list such that they are not used by the application 112 for verification (while still storing the biometric data and/or the word in the list). In such embodiments, the application 112 is able to assign the unusable marking with an expiration value (e.g. time) wherein after the expiration value is reached, the unusable marking is removed and the word (and the biometric data) is able to be used again by the application 112 for verification. In addition to the target word set related biometric data described above, the biometric data is able to comprise facial images, voice audio, facial video of speech, fingerprint data, iris images, blood type and/or other data representing biological characteristics of the person. In particular, the biometric data is able to further comprise immutable biological signatures of the person that can be used in the identity verification or registration process by the application 112 if needed. All of the personal data described herein is able to be stored in their native or an encrypted format.

In the case where the biometric data repository 102 is an MIDC array, each MIDC (and thus each row) of the array is dedicated to personal information (e.g. biometric data, identity data, set of target words and an identifier) about a single person/account, wherein any additional information or changes in information is able to be reflected in additional blocks appended to the end of the MIDC for that person/account. Accordingly, each MIDC only ever represents one person and is the blockchain equivalent of all their data on a database. For example, as described above, the personal information stored in each MIDC is able to comprise a set of target words (having associated biometric data), an identifier and identity (e.g. facial image, fingerprint, name, social security number, username/password, driver's license number, alphanumeric code/string (optionally assigned by the application 112), date of birth, height, weight, sex, security questions/answers, account number or a combination and/or mathematical modulation thereof) and biometric data (e.g. facial images, voice audio, facial video of speech, fingerprint data, iris images, blood type and/or other data representing biological characteristics of the person including biometric measurements of the person saying the set of target words). This personal information is able to be associated with each other in their native or an encrypted format.

The challenge question repository 104 is able to store, update and/or maintain a master list of verification words as well as challenge data comprising a plurality of pairs of challenge questions and answers that are each associated with a set of one or more target words (a target word set) from the master list. The master list of verification words is able to be added to or subtracted from as needed to meet the variance demands of the verification process. The challenge questions and/or answers are able to comprise a string of words including at least one of the associated set of target words. For example, the challenge questions are able to be fill in the blank questions wherein the missing word or words (e.g. the blank(s)) in the challenge question is one or more of the set of target words (such that the answer word(s) or answer sentence include the target word(s)), and/or one or more of the (not missing) words in the challenge question itself is/are one or more of the set of target words. Thus, either one or both of the challenge question and the answer are able to include target words without the person answering the challenge question knowing which words are the target words. Similarly, the challenge question is able to be a non-fill in the blank question with either one or both of the challenge question and answer including one or more of the associated set of target words. In some embodiments, the challenge question, fill in the blank or not) is able to be a multiple choice question or have associated hints that are displayed/presented to the person being challenged along with the challenge question. Like, the answer, these choices and/or hints are able to include one or more of the set of target words.

Alternatively, the challenge questions are instead able to be a challenge statement that does not have an answer, but including one or more of the associated set of target words, wherein the response to the challenge statement is the person saying the challenge statement aloud. Alternatively, the challenge question repository 104 is able to be omitted and/or replaced with an artificial intelligence challenge question generator module that is a part of the application 112 and that dynamically generates challenge questions and associated answers based on one or more target words selected by the application 112. In such embodiments, the target word set for each of the groups of PPI on the biometric data repository 102 is able to be randomly generated by the registration module instead of being selected from a master list.

The identity verification application 112 is able to comprise a registration module, verification module and a data management module. Alternatively, more or less modules (and/or micro-services) are able to be used and/or one or more of the modules (and their associated functions) are able to be combined into single modules or divided into separate modules. As used herein, that a "module" is able to refer to one or more executable instructions, programs, applications, programming code, software agents and/or distributed or central operating systems for implementing the functions of the module. Alternatively or in addition, one or more of the functions of the modules are able to be implemented via hardware and/or firmware (e.g. of the device 106 and/or server 108) such that the module is able to be implemented partially or wholly in hardware and/or firmware. As discussed above, the modules are able to be operating on and/or a person is able to interact with the modules as described below via the local device 106, the network device 108 or both. In particular, although a camera and/or microphone of the local device 106 is discussed below, it is understood that the camera, microphone and/or any other components are able to be components of the network device 108, components of a combination of the user and network device 106, 108 or components divided in any manner between the local device 106 and the network device 108.

The registration module provides a graphical user interface and executable instructions that enable a person to create an account and establish a baseline identity group/entry on the system 100 by inputting private personal information (PPI) including a unique identifier, identity and personal biometric data for storage on the biometric data repository 102. To establish the unique identifier, the registration module enables submission of a unique identifier (e.g. username) by the person. Alternatively, the unique identifier is able to be generated and/or assigned by the registration module rather than input by the person. For example, the registration module is able to generate and assign the unique identifier based on data (e.g. name, birth date, etc.) parsed from a submitted identification card/document (e.g. driver's license, passport, etc.) as described below. In either case, this unique identifier is then able to be used by the person and the application 112 to indicate/identify which stored identity they would like to be verified as their identity (e.g. within an identity verification request message/command submitted by the person to the verification module as described below).

To establish an identity that is to be associated with the unique identifier, the registration module enable the person to submit an identification card (e.g. driver's license, passport, student identification card, or other identification card preferably including a facial image/picture of the person) whose data the registration module is able to capture using a camera of the local device 106. Specifically, the registration module is able to access (or direct the person to access) the camera on the local device 106 (or another device) and provide command prompts with a graphical user interface of the application 112 instructing the person how to capture and submit images/video of the identification card. Alternatively, the facial image and/or other data from an identification card is able to be uploaded to the registration module by the person from a stored location (e.g. from a previous image capture of the card, from the entity that issued the card and/or from another database). The registration module is then able to parse the capture images to determine and store the data written on the identification card along with the facial image of the person on the card. This captured data/image is then able to serve as the identity associated with the unique identifier. Alternatively, the registration module enables the person to manually input their identity (e.g. name, social security number, date of birth, or other identifying characteristics) to the registration module which then uses the submitted identity data to access and download a facial image and/or other data about the person from governmental and/or other databases (e.g. department of motor vehicles, internal revenue service, or other entities).

Additionally, to establish biometric data to be associated with the identity and unique identifier, the registration module enables the person to submit a live image/video capture of their face. For example, like the identification card submission, the registration module is able to access (or direct the person to access) the camera on the device 106, 108 (or another device) and provide command prompts with a graphical user interface of the application 112 instructing the person how to capture and submit images/video of their face. Unlike the identification card however, these images/video must be captured contemporaneously with the registration, not previously recorded. The registration module is then able to determine if the captured facial images sufficiently match the facial image(s) of the identity. If they do not, the registration module transmits a failure message to the person and/or directs the person to resubmit their facial image and/or resubmit the identity information (as described above).

This facial matching ensures that a minor cannot attempt to spoof the system and register as an adult, and conversely, an adult cannot attempt to trick system 100 and register as a minor. Additionally, this facial matching ensures that the correct data privacy law requirements are applied to that person/identity/group as data privacy laws are applicable based on the users age for laws pertaining to things such as opting in versus opting out, use of targeted advertisements, and so on. Further, the data privacy law recitals for "Do Not Sell My Personal Information" are different for minors and adults. In some embodiments, in the event the registering person is a minor, a school ID is able to be the identity card/document and the person will go through all of the same registration process steps. Alternatively, the system 100 is able to require that the minor attempting to register to have a parent or guardian to provide their identification card/document as proof that they have given permission for the minor to register an account on the system 100.

If the facial images match, the registration module accesses the master list of all of the verification words from the challenge repository 104 and selects one or more of the verification words to be the initial set of target words for that identity. In some embodiments, the registration module randomly selects each of the initial set of target words from the master list. Alternatively, the registration module is able to randomly generate the target word set independent of the words of the master list. This target word set is then associated with the unique identifier and identity as a part of the PPI. Then, like the live image/video facial image capture, the registration module enables the person to submit a live audio and/or video capture of their voice and/or face speaking each of the set of target words. For example, the registration module is able to access (or direct the person to access) the microphone and/or camera on the device 106, 108 (or another device) and provide command prompts with a graphical user interface of the application 112 presenting the target words and instructing the person how to capture and submit audio and/or video of their voice and/or face speaking each of the target words. Like the live facial image capture, this audio and/or video must be captured contemporaneously with the registration, not previously recorded. This audio and/or video along with the target word set is then stored by the registration module in the biometric data repository 102 (along with the identity and the unique identifier) the target word biometric reference data corresponding to the set of target words.

As a result, the target word biometric reference data is able to be used to verify whether a person matches the identity that it is associated with using the verification module describe below. In some embodiments, the live facial image data is also saved in the biometric data repository 102 as a part of the biometric data for that identity. In some embodiments, the registration module is able to further live capture and add to the biometric data for that identity other biometric data such as an iris scan, voice recording, fingerprint scan, facial scan, blood type, other biological characteristics or any combination of the foregoing. In some embodiments, other PPI for a group/entry is able to be received/requested by the registration module during the registration process (either manually submitted by the person, parsed from submitted identification cards and/or measured by the device 106, 108) is able to comprise one or more of an identifier of the local device 106, the person's age, gender, address, email, phone number, income level, religion, political affiliation, race, nationality, interests, height, hair color, eye color, weight, medical conditions, family members, education level, degrees earned, occupation and/or other characteristics of the person. In some embodiments, the registration module requires the person to grant permission for the input, storage and use of the PPI input during the registration and verification processes. In such embodiments, the registration module is able to limit which type of the PPI that are requested/input during the registration process to those that were granted permission for by the person. As a result, the registration module provides the benefit of enabling the system 100 to be global privacy law/rule compliant. Further, the system 100 provides the benefit of ensuring that only persons with matching identification cards and/or other data are able to submit biometric reference data and utilize the system for identity verification.

The verification module provides a graphical user interface that enables a person to submit an identity verification request indicating one of the identities stored in the biometric data repository 102 and subsequently conducting a verification process to determine if the person matches the indicated one of the identities. In some embodiments, the identity verification request is able to comprise selecting a verification request function on the application 112 using the local device 106 and entering the unique identifier of the identity which the person would like to be verified against. Alternatively, other types of requests indicating the unique identifier are able to be used such as verbal requests input using microphone of the device 106, 108, test messages transmitted to the application 112 or other types of messages. In response to receiving the identity verification request, the verification module accesses the personal information stored on the biometric data repository 102 that is associated with the indicated unique identifier. If the unique identifier is not found, the module presents a message to the person indicating that the unique identifier could not be found and/or requesting resubmission of the request indicating a different unique identifier.

If the unique identifier is found, the verification module selects one or more selected words of the set of target words associated with the unique identifier and selects a challenge question and answer pair associated with one or more of the selected words from the challenge question repository 104. As described above, one or more of the selected words are able to be a part of the challenge question and/or a part of the answer, wherein there is no way for a fraudulent actor to determine which words are the selected words. In some embodiments, the selected words are randomly selected from the set of target words (e.g. using a random value generator). Alternatively, the selected words are able to be selected from the set of target words according to a metric, pattern, rotating schedule or other protocol.

The verification module then presents the selected challenge question to the person on the device 106, 108. The challenge question requires a verbal response from the person in order to verify their identity. In some embodiments, the question is presented verbally using a microphone of the device 106, 108, textually using a display of the device 106, 108 or both. In some embodiments, simultaneous or concurrent with presenting the challenge question to the person, the verification module starts a question timer (and optionally displays the timer to the person on the device 106), wherein if the person does not submit an answer to the challenge question before the time expires the verification module indicates that the verification has failed and/or selects/issues a new challenge question.

The verification module facilitates submission of an audio and/or video response to the challenge question in a manner similar to the capture of target word biometric reference data during the registration process. Specifically, the verification module enables the person to submit a live audio and/or video capture of their voice and/or face speaking their response to the challenge question. For example, the verification module is able to access (or direct the person to access) the microphone and/or camera on the device 106, 108 (or another device) and provide command prompts with a graphical user interface of the application 112 presenting the challenge question and instructing the person how to capture and submit audio and/or video of their voice and/or face speaking their response to the challenge question. Like the live facial image and target word capture of the registration process, this audio and/or video must be captured contemporaneously with the verification process, not previously recorded. In some embodiments, for both the registration process and the verification process, during the recording of biometric target words and/or challenge question responses, the application 112 (via the modules) requires that the person (or their face) stay within view of the camera during the entirety of the audio/video recording.

After receiving a response to the challenge question, the verification module determines if the response includes the answer that is associated with the selected challenge question. Concurrently, the verification module identifies/parses the selected words from audio and/or video data of the response and determines both: whether all of the selected words found within the challenge question and answer are present in the response; and whether they all match the reference audio and/or video data of the corresponding target words (associated with the unique identifier in the request) stored in the biometric data repository 102. As described above, these selected words are able to be found in the challenge question itself, in the correct answer to the challenge question, or both. If the response is not or does not include the correct answer; not all of the selected words found in the challenge question and answer are found in the response; the selected word audio and/or video data found in the response does not match the reference target word audio and/or video data stored in the biometric data repository 102; no response is received; or a response is not received before a set timer expires (if applicable), the verification module sends a verification failure message to the person and/or selects/issues a new challenge question (e.g. until the person fails the verification process a predetermined number of times).

Only then, upon receiving a response that both answers the challenge question correctly and includes audio and/or video data of all the selected words in the question/answer that matches the reference target word audio and/or video data (of the same words), does the verification module verify the identity of the person as matching the identity associated with the submitted unique identifier (and biometric data). In some embodiments, the verifying of the identity of the person also triggers the verification module to take one or more actions such as to open a physical or digital lock and/or grant access to one or more services and/or devices. In some embodiments, the actions taken are based on a set of privileges associated with the identity/unique identifier and stored on the biometric data repository along with the identity data. For example, in some embodiments the verification module takes the action of decrypting an encrypted password or key (stored on the local device 106) that then enables the device 106 to access a restricted device, network, programs and/or services using the decrypted password/key upon a successful verification process. Other examples of possible actions include, but are not limited to, system logins (known or unknown user/device) and permission functionality enablement (e.g. user requested data export, user requested data audit, user requested data deletion, user requested password reset).

As a result, the system 100 provides the benefit preventing fraudulent identity verification by dynamically determining selected words and corresponding challenge questions/answers which thus could not have been previously known or determined as well as requiring both correct answers in the response as well as the audio and/or video data of the selected words of that response to match the stored values for that identity.

During and/or after the performance of identity verification processes by the verification module, the data management module is able to remove existing words and add new words to the target word set of each group of personal information (e.g. unique identifier, identity, target word set, biometric data) stored on the biometric data repository 102. Specifically, the target word set for any particular group is able to be updated by the data management module by adding new words to the set (and the corresponding audio and/or video data to the biometric data) each time the associated audio and/or video biometric data is captured (e.g. during a successful verification process) and/or selectively removing words from the target word set (and optionally from the biometric data) upon selection for a verification process (whether successful or not).

In particular, the data management module is able to add any of the words whose audio and/or video of being spoken by the identity/person was captured during a successful verification process to the target word set (and biometric reference data) of the corresponding group. For example, if in a successful verification process the correct response to a challenge question included 10 words, but only 2 of the words were the selected target words, the remaining 8 words are able to be added to the set of target words for that group (assuming they are not already words in the target word set that were just not selected for that verification process).

Additionally, the data management module is able to remove words (and/or the associated biometric data) from a group that have been used in a previous verification process for that group once (or a set number of times), wherein a target word is "used" in the process for that group any time it is one of the selected words and/or is one of the selected words that is actually found in the selected challenge question and/or answer. This removal is able to comprise the removal of both the word from the target word set and the corresponding audio and/or video from the biometric data, or just removal of the word from the target word set (with the corresponding audio and/or video data remaining in the biometric data). Using the same example as above, the 2 selected words of the 10 words in the response are able to be removed from the target word set so that they are not used in a subsequent verification process for that group.

Alternatively, the words (and/or the associated biometric data) are able to not be removed even after being used in a previous verification process once (or the set number of times) for that group, and instead the data management module is able to just mark those words as unusable in the target word set such that they are not used by the verification module for verification of that group (while still storing the associated biometric data and/or the word in the target word set). In such embodiments, the data management module is able to assign the unusable marking with an expiration value (e.g. time) wherein after the expiration value is reached, the unusable marking is removed and the word (and the biometric data) is able to be used again by the verification module for verification for that group. In any case, the data management module enables the system 100 to provide the benefit of an ever expanding/changing target word set for each of the groups such that the same words do not need to be used repeatedly. In some embodiments, the data management module is also able to add new PPI (e.g. device identifiers, addresses or any of the types of PPI described above) to and/or replace/update old data from the group on the biometric data repository 102 whenever new PPI is presented (e.g. a new local device 106 is used) during and/or after a successful identity verification process is completed by the verification module for a person. As a result, the data management module provides the advantage of continually updated the stored PPI for each of the groups on the biometric data repository 102. Alternatively, the data management module is able to be omitted.

Figure 2:
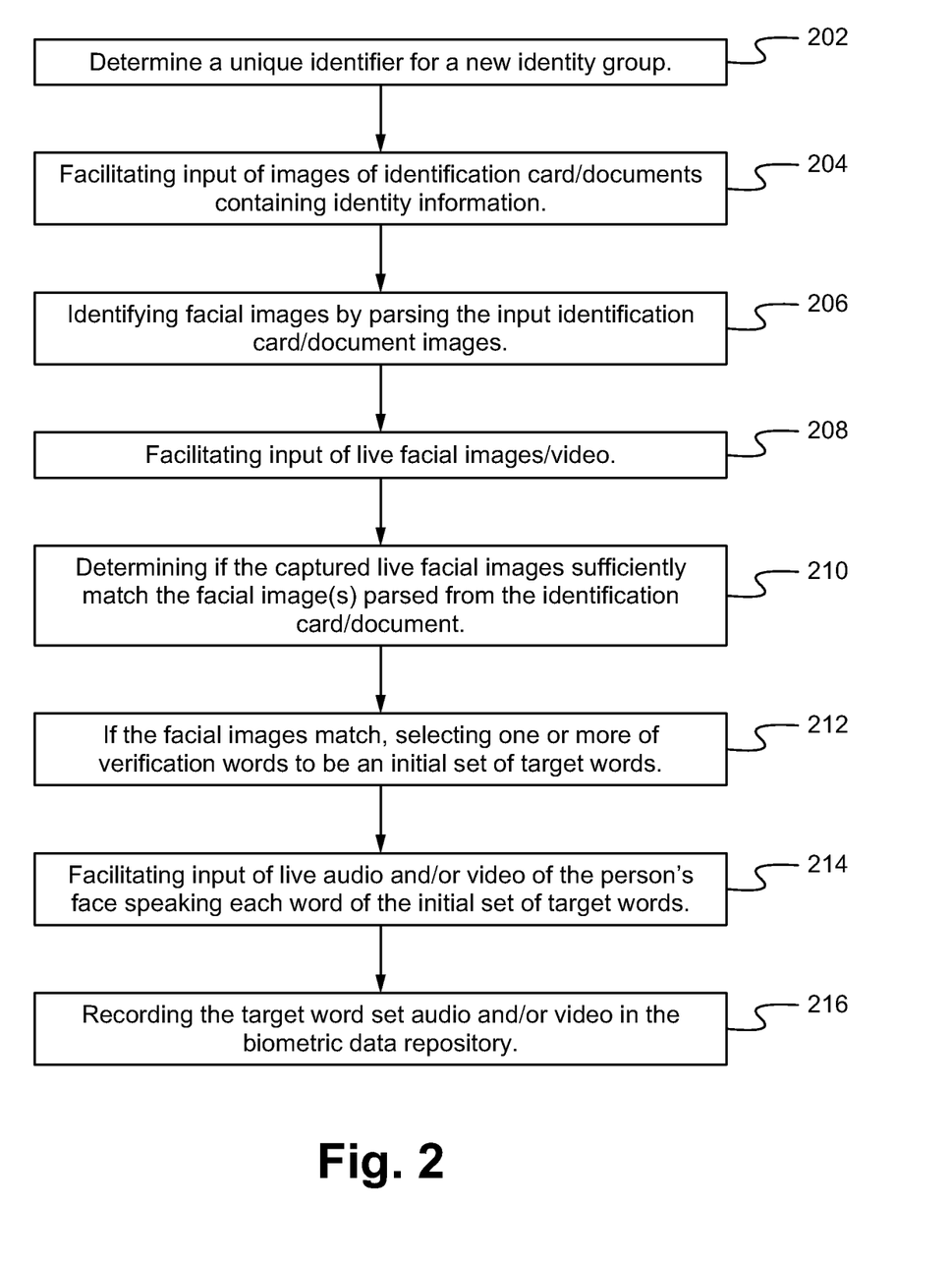
FIG. 2 illustrates a method of registering a new identity on the system according to some embodiments.

FIG. 2 illustrates a method of registering a new identity on the system 100 according to some embodiments. As shown in FIG. 2, the registration module determines a unique identifier for a new identity group at the step 202. In some embodiments, the registration module inputs a unique identifier manually generated by a person (e.g. via a device 106, 108). Alternatively or in addition, the registration module generates and assigns a unique identifier. In some embodiments, the registration module requires the person to grant permission for the input, storage and use of the PPI input during the registration and verification processes. In such embodiments, the registration module is able to limit which type of the PPI that are requested/input during the registration process to those that were granted permission for by the person.

The registration module facilitates input of identity information at the step 204. Specifically, the registration module enables the person (via a device 106, 108) to submit an identification card/document (e.g. driver's license, passport, student identification card, or other identification card preferably including a facial image/picture of the person) whose data the registration module is able to capture using a camera of the device 106, 108. In some embodiments, the registration module is able to access (or direct the person to access) the camera on the device 106, 108 (or another device) and provide command prompts with a graphical user interface of the application 112 instructing the person how to capture and submit images/video of the identification card. For example, the registration module is able to ask the person through the prompts to use the camera to capture a multi-angle scan (e.g. front and back of card and/or all pages of document) of the identification card/document. In some embodiments, the module is able to detect any holograms on the card/document and/or ask the person to rotate the card/document so the system 100 is able to capture any hologram and/or any information embedded in the hologram in that card/document.

The registration module is then able to parse the input identification card/document images in order to identify facial pictures and/or other data indicated by the card/document at the step 206. Alternatively, the facial image and/or other data from an identification card is able to be uploaded to the registration module by the person from a stored location (e.g. from a previous image capture of the card/document, from the entity that issued the card (e.g. government website) and/or from another database). Alternatively, the registration module enables the person to manually input their identity data (e.g. name, social security number, date of birth, driver's license number, passport number, or other identifying characteristics) to the registration module which then uses the submitted identity data to access and download a facial image and/or other data about the person from governmental and/or other databases (e.g. department of motor vehicles, internal revenue service, or other entities). In such embodiments, the card/document image capture and parsing steps are able to be omitted and replaced with manually inputting and/or the card/document data/image website accessing and downloading steps.

The registration module facilitates input of live facial images/video at the step 208. Specifically, the registration module is able to access (or direct the person to access) the camera on a device 106, 108 (or another device) and provide command prompts with a graphical user interface of the application 112 instructing the person how to capture and submit images/video of their face. For example, the module is able to use the user interface to direct the person to move their head in various directions, so that the system 100 is able to capture a fully integrated, multi-angle view facial recognition capture of the face of the person. Unlike the identification card/document capture however, these images/video must be captured contemporaneously with the registration, not previously recorded. The registration module is then able to determine if the captured live facial images sufficiently match the facial image(s) of the identity parsed from the identification card/document at the step 210. If they do not, the registration module transmits a failure message to the person and/or directs the person to resubmit their facial image and/or resubmit the identity card/document (as described above) and the method returns to the live facial image capture and/or identification card/document capture steps described above.

If the facial images match, the registration module selects one or more of verification words to be an initial set of target words and associates the set with the group/entity being registered at the step 212. In some embodiments, the registration module randomly selects or selects according to a pattern each of the initial set of target words from the master list. Alternatively, the registration module is able to randomly generate the target word set independent of the words of the master list.

The registration module facilitates input of live audio and/or video of the person's face speaking each word of the initial set of target words at the step 214. Specifically, the registration module is able to access (or direct the person to access) the microphone and/or camera on a device 106, 108 (or another device) and provide command prompts with a graphical user interface of the application 112 presenting the target word set and instructing the person how to capture and submit audio and/or video of their voice and/or face individually speaking each of the target words. Like the live facial image capture, this audio and/or video must be captured contemporaneously with the registration, not previously recorded. The registration module then records this target word set audio and/or video (e.g. target word biometric reference data) in the biometric data repository 102 (along with the other data of the group/entry: the identity data, the unique identifier and the target word set) at the step 216. In some embodiments if the biometric data repository 102 is a MIDC array, each of these initial words and their associated biometrics (as well any subsequent words/phrases captured in the verification process able to be added by the data management module as described below) are stored individually, by registration module (and/or data management module) in individual blocks of the MIDC for that group/entry. Thus, the method provides the advantage of enabling secure establishment of an identity along with associated biometric data for future identity verification. Although the steps are described above in a particular exemplary order all other permutations of orders are contemplated but omitted for the sake of brevity. For example, any order of the unique identifier, identity data and live facial data capture steps are able to be used.

Figure 3:
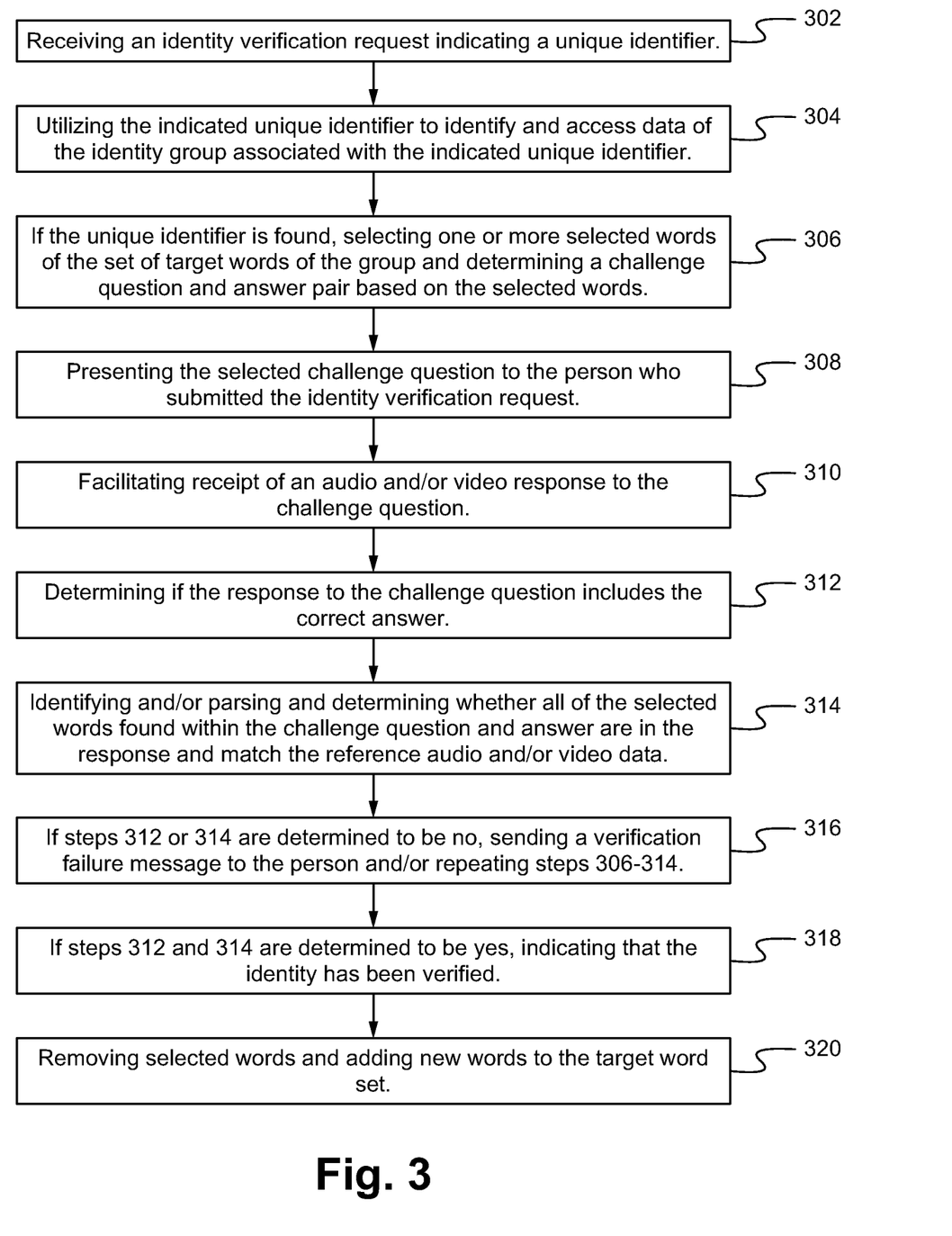
FIG. 3 illustrates a method of dynamically verifying an identity of a person according to some embodiments.

FIG. 3 illustrates a method of dynamically verifying the identity of a person according to some embodiments. As shown in FIG. 3, the verification module receives an identity verification request indicating a unique identifier at the step 302. In some embodiments, receiving the identity verification request is able to comprise providing a verification request function on the graphical user interface of the application and enabling the manual entering of the unique identifier of the identity which the person would like to be verified against. Alternatively, the receiving is able to comprise the enabling of other types of requests indicating the unique identifier such as verbal requests input using microphone of the device 106, 108, test messages transmitted to the application 112 or other types of messages. The verification module uses the indicated unique identifier to identify and access the PPI stored on the biometric data repository 102 that includes the indicated unique identifier at the step 304. If the indicated unique identifier is not found amongst the groups/entries on the repository 102, the verification module is able to present a message to the person indicating that the unique identifier could not be found and/or requesting resubmission of the request indicating a different unique identifier.

If the unique identifier is found, the verification module selects one or more selected words of the set of target words associated with the unique identifier and determines a challenge question and answer pair based on the selected words at the step 306. In some embodiments, the verification module dynamically generates the challenge question and answer based on the selected words. Alternatively, the verification module selects or generates (using a variety, or combination, of protocols including but not limited to AI and/or Machine Learning) the challenge question and answer pair from the challenge question repository 104 based on the selected words. As described above, one or more of the selected words are able to be a part of the challenge question and/or a part of the answer, wherein there is no way for a fraudulent actor to determine which words are the selected words. In some embodiments, the selected words are randomly selected from the set of target words (e.g. using a random value generator). Alternatively, the selected words are able to be selected from the set of target words according to a metric, pattern, rotating schedule or other protocol.

For example, the verification module is able to select the word "blue" from the target word set for the group/entry comprises the words: blue, apple, dog, tree, ice, care, boy, cloud, computer, and ocean, and determine the challenge question "Please repeat the following sentence while filling in the blank 'The American flag is ______, white and blue'" and correct answer "The American flag is red, white and blue." In some embodiments, the instructions are a part of the challenge question. Alternatively, only the question itself "The American flag is ______, white and blue" is the challenge question. In some embodiments, the selected word(s) are found in only the challenge question, in only the correct answer or in both the question and the answer. In any case, because the choice of target word has not been determined up until the instant the choice of word is made by the system 100, there is no way a fraudulent actor can have prior knowledge of what word will be chosen.

The verification module then presents the selected challenge question to the person at the step 308. The challenge question requires a verbal response from the person in order to verify their identity. The question is able to be presented verbally using a microphone of the device 106, 108, textually using a display of the device 106, 108 or both. In some embodiments, simultaneous or concurrent with presenting the challenge question to the person, the verification module starts a question timer (and optionally displays the timer to the person on the device 106, 108), wherein if the person does not submit an answer to the challenge question before the time expires the verification module indicates that the verification has failed and/or selects/issues a new challenge question.

The verification module facilitates receipt of an audio and/or video response to the challenge question at the step 310. Specifically, the verification module enables the person to submit a live audio and/or video capture of their voice and/or face speaking their response to the challenge question. For example, the verification module is able to access (or direct the person to access) the microphone and/or camera on a device 106, 108 (or another device) and provide command prompts with a graphical user interface of the application 112 presenting the challenge question and instructing the person how to capture and submit audio and/or video of their voice and/or face speaking their response to the challenge question. Like the live facial image and target word capture of the registration process, this audio and/or video must be captured contemporaneously with the verification process, not previously recorded. In some embodiments, for both the registration process and the verification process, during the recording of biometric target words and/or challenge question responses, the application 112 (via the modules) requires that the person (or their face) stay within view of the camera during the entirety of the audio/video recording.

After receiving a response to the challenge question, the verification module determines if the response includes the correct answer that is associated with the selected challenge question at the step 312. So, for the above example, the verification module determines if the response included the entire correct answer sentence "the American flag is red, white and blue" with the word "red" filling in the blank of the challenge question. Concurrently, the verification module identifies/parses the selected words from audio and/or video data of the response and determines both: whether all of the selected words found within the challenge question and answer are present in the response; and whether they all match the reference audio and/or video data of the corresponding target words at the step 314. So for the above example, the verification module parses the portion of the response including the word "blue" and determines if it matches the reference audio and/or video data of the person saying the word "blue" during the registration process that is now stored with the unique identifier as an entry/group on the biometric data repository 102. As described above, these selected words are able to be found in the challenge question itself, in the correct answer to the challenge question, or both.

If steps 312 or 314 fail, the verification module sends a verification failure message to the person and/or selects/issues a new challenge question at the step 316. Specifically, if the response is not or does not include the correct answer; not all of the selected words found in the challenge question and answer are found in the response; the selected word audio and/or video data found in the response does not match the reference target word audio and/or video data stored in the biometric data repository 102; no response is received; or a response is not received before a set timer expires (if applicable), the verification module sends a verification failure message to the person and/or selects/issues a new challenge question (e.g. until the person fails the verification process a predetermined number of times).

If both steps 312 and 314 succeed, the verification module indicates that the identity has been verified at the step 318. Specifically, upon receiving a response that both answers the challenge question correctly and includes audio and/or video data of all the selected words in the question/answer that matches the reference target word audio and/or video data (of the same words), does the verification module verify the identity of the person as matching the identity associated with the submitted unique identifier (and biometric data). In some embodiments, the verifying of the identity of the person also triggers the verification module to take one or more actions such as to open a physical or digital lock and/or grant access to one or more services and/or devices. In some embodiments, the actions taken are based on a set of privileges associated with the identity/unique identifier and stored on the biometric data repository along with the identity data. For example, in some embodiments the verification module takes the action of decrypting an encrypted password or key (stored on the local device 106) that then enables the device 106 to access a restricted device, network, programs and/or services using the decrypted password/key upon a successful verification process. Other examples of possible actions include, but are not limited to, system logins (known or unknown user/device) and permission functionality enablement (e.g. user requested data export, user requested data audit, user requested data deletion, user requested password reset).

The data management module removes existing words and adds new words to the target word set at the step 320. Specifically, the target word set for any particular group is able to be updated by the data management module by adding new words to the set (and the corresponding audio and/or video data to the biometric data) each time the associated audio and/or video biometric data is captured (e.g. during a successful verification process) and/or selectively removing words from the target word set (and optionally from the biometric data) upon selection for a verification process (whether successful or not). In particular, the data management module is able to add any of the words (e.g. words in the response/answer) whose audio and/or video of being spoken by the identity/person was captured during a successful verification process to the target word set (and biometric reference data) of the corresponding group. Similarly, the data management module is able to remove words (and/or the associated biometric data) from a group that have been used in a previous verification process for that group once (or a set number of times), wherein a target word is "used" in the process for that group any time it is one of the selected words and/or is one of the selected words that is actually found in the selected challenge question and/or answer. This removal is able to comprise the removal of both the word from the target word set and the corresponding audio and/or video from the biometric data, or just removal of the word from the target word set (with the corresponding audio and/or video data remaining in the biometric data). Thus, continuing the above example, from the words in the response/answer "the American flag is red, white and blue," the data management module is able to add the words "the," "American," "flag," "is," "red," "and" and "white" to the target words set and remove the used target word "blue" from the target word set forming a new different target words set. This new different target words set is then able to be used for a subsequent identity verification process for that unique identifier.

Alternatively, the words (and/or the associated biometric data) are able to not be removed even after being used in a previous verification process once (or the set number of times) for that group, and instead the data management module is able to just mark those words as unusable in the target word set such that they are not used by the verification module for verification of that group (while still storing the associated biometric data and/or the word in the target word set). In such embodiments, the data management module is able to assign the unusable marking with an expiration value (e.g. time) wherein after the expiration value is reached, the unusable marking is removed and the word (and the biometric data) is able to be used again by the verification module for verification for that group. Alternatively, step 320 is able to be omitted. Although the steps are described above in a particular exemplary order all other permutations of orders are contemplated but omitted for the sake of brevity.

Figure 4:
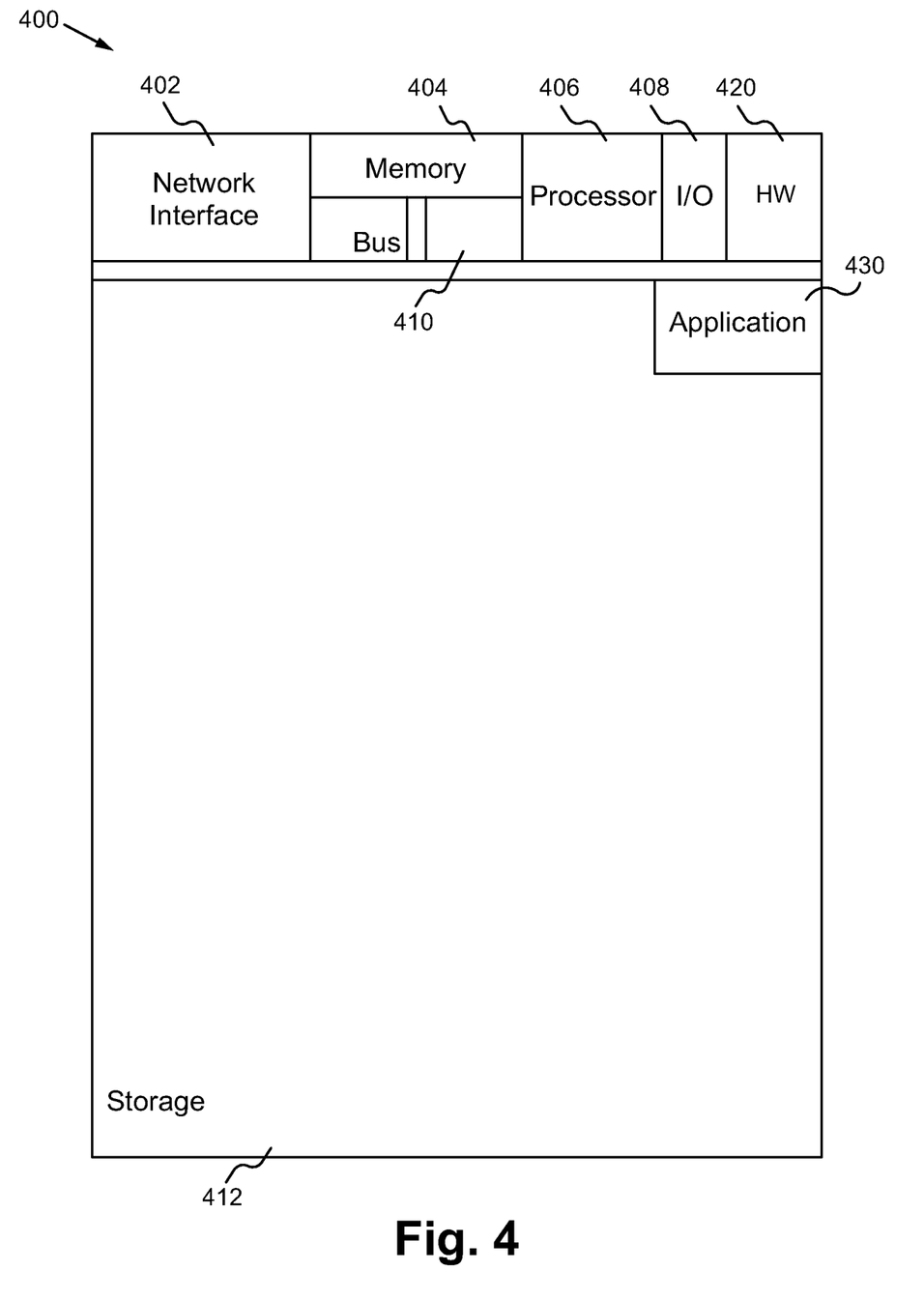
FIG. 4 illustrates a block diagram of an exemplary computing device configured to implement the system according to some embodiments.

FIG. 4 illustrates a block diagram of an exemplary computing device, server or other device 400 configured to implement the system 100 according to some embodiments. In addition to the features described above, the local and/or network devices 106, 108 are able to include some or all of the features of the device 400 described below. In general, a hardware structure suitable for implementing the computing device 400 includes a network interface 402, a memory 404, a processor 406, I/O device(s) 408 (e.g. reader), a bus 410 and a storage device 412. Alternatively, one or more of the illustrated components are able to be removed or substituted for other components well known in the art. The choice of processor is not critical as long as a suitable processor with sufficient speed is chosen. The memory 404 is able to be any one or more conventional computer memories known in the art. The storage device 412 is able to include a hard drive, CDROM, CDRW, DVD, DVDRW, flash memory card or any other storage device. The computing device 400 is able to include one or more network interfaces 402. An example of a network interface includes a network card connected to an Ethernet or other type of LAN. The processor 406 is also able to comprise an internal processor memory. The I/O device(s) 408 are able to include one or more of the following: keyboard, mouse, monitor, display, printer, modem, touchscreen, button interface and other devices. The operating software/applications 430 or function(s)/module(s) thereof are likely to be stored in the storage device 412 and memory 404 and processed as applications are typically processed. More or fewer components shown in FIG. 4 are able to be included in the computing device 400. In some embodiments, identity verification system hardware 420 is included. Although the computing device 400 in FIG. 4 includes software 430 (e.g. modules, instructions, programs, applications (e.g. application 112 having the modules described herein)) and hardware 420 (e.g. firmware) for the system 100, the system 100 is able to be implemented on a computing device or devices in hardware, firmware, software or any combination thereof. The memory 404, storage device 412 and/or processor 402, individually or in combination, are able to store and execute some or all the software (e.g. one or more sets of instructions) embodying or utilized by any one or more of the methodologies or functions described herein thereby causing the device 400 to perform said methodologies or functions.

As used herein, the term "memory" or "machine-readable medium" is able to refer to a single memory/medium or multiple memories/media (e.g., a centralized or distributed database, and/or associated caches and servers) that store one or more sets of instructions. The memory/media is able to be any medium that is capable of storing, encoding, and/or carrying a set of instructions for execution by the machine/device/computer and that causes the machine/device/computer to perform any of the one or more of the methodologies and/or functions of the present application, or that is capable of storing, encoding, or carrying data structures utilized by or associated with such a set of instructions. The memory/media shall accordingly be taken to include, but not be limited to, solid-state memories, optical and magnetic media. Such memory/media is also able to include, without limitation, hard disks, floppy disks, NAND or NOR flash memory, digital video disks, RAM, ROM, and the like.

The dynamic identity verification system, method and device described herein has numerous advantages. Specifically, the system 100 provides the benefit of an ever expanding/changing target word set for each of the groups such that the same words do not need to be used repeatedly. Also, the system 100 provides the benefit preventing fraudulent identity verification by dynamically determining selected words and corresponding challenge questions/answers which thus could not have been previously known or determined as well as requiring both correct answers in the response as well as the audio and/or video data of the selected words of that response to match the stored values for that identity. Additionally, the system 100 provides the benefit of being global privacy law/rule compliant as well as ensuring that only persons with matching identification cards and/or other data are able to submit biometric reference data and utilize the system for identity verification. Moreover, it provides the benefit of ensuring that the system 100 cannot be phished, credential stuffed, hacked, social engineered or deep faked. It also serves to ensure data provenance of any PPI onboarded by the person. Indeed, the verification system 100 described herein ensures that the actual person that onboarded the biometrics initially is the same person giving an answer by both dynamically selected the selected words and/or the challenge question based on those words (such that they cannot be anticipated by a fraudulent actor) as well as requiring a correct contextual answer to the challenge question (optionally within a set time period).

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims. Each of the computing entities (e.g. devices, servers, platforms, or other devices able to process instructions) described herein are able to comprise a processor, a non-transitory computer-readable medium storing instructions and/or firmware embodying instructions that when executed by the processor cause the computing entity to perform the functions described herein. In other words, it is understood that the functions and computing entities described herein can be implemented in an operating environment comprising software (e.g. modules, applications, programs and/or computer-executable instructions) installed on a computing device, in hardware (e.g. functions embodied as firmware), or in a combination of software and hardware.

What is claimed is:

1. A dynamic biometric identity verification system for verifying an identity of a person, the system comprising:
    a non-transitory computer-readable biometric data memory storing an identification pair including an identifier and biometric data of the person, the biometric data including reference audio data of the person saying a list of one or more of a plurality of target words; and
    a verification device including a microphone, a display, a processor and a non-transitory computer-readable memory storing an identity verification module that when executed by the processor causes the verification device to:
        generate a graphical user interface on the verification device, the graphical user interface including a receiving function, an access function, a selection function, a determining function and a verification function, wherein the receiving function is configured to receive an identification request from the person, the identification request indicating the identifier of the person; wherein the access function is configured to access the biometric data memory and identify the biometric data of the person based on the identifier of the person indicated by the identification request; wherein the selection function is configured to select one or more selected words of the list; and further wherein the determining function is configured to determine a selected challenge question based on the selected words, the selected challenge question having a correct answer and at least one of the selected challenge question and the correct answer including the selected words;

generate and output one or more of at least one digital image and digital audio signal with the verification device, the one or more of the at least one digital image and the digital audio signal indicating the selected challenge question; and store response audio data input by the microphone on the non-transitory computer-readable memory, the response audio data being in response to the selected challenge question;

wherein the verification function is configured to indicate that the person corresponds to the identifier based on: the response audio data including the selected words and portions of the response audio data that include the selected words matching portions of the reference audio data that include the selected words; and the response audio data including the correct answer.

2. The system of claim 1, further comprising a non-transitory computer-readable challenge repository storing a plurality of challenge questions including the selected challenge question, wherein the challenge questions are each paired with one or more answers, wherein each of the challenge questions has at least one characteristic of a group of characteristics comprising:

the challenge question comprises one or more of the target words; and the answers to the challenge question comprise one or more of the target words.

3. The system of claim 2, wherein each of the answers is a sentence including the one or more of the target words.

4. The system of claim 2, wherein the selected challenge question is a fill in a blank question with the blank being one of the selected words.

5. The system of claim 1, wherein when executed by the processor the identity verification module causes the verification device to begin a timer when presenting the selected challenge question to the person and indicate that the identity of the person could not be verified if the response audio data is received after a predetermined amount of time has elapsed since the timer was began.

6. The system of claim 1, wherein when executed by the processor the identity verification module causes the verification device to:

remove the selected words from the list after the selected words have been used to verify if the person corresponds to the identifier;

based on determining that the person corresponds to the identifier, add to the list one or more words forming the correct answer in the response audio data that are not the selected words; and store parts of the response audio data including the one more words added to the list in the biometric data memory with the reference audio data of the person.

7. The system of claim 1, wherein the biometric data includes reference video data of the person saying the list of one or more of the plurality of target words.

8. The system of claim 7, wherein when executed by the processor the identity verification module causes the verification device to receive response video data in response to the selected challenge question, and further wherein the indicating that the person corresponds to the identifier is also based on:

the response video data including the person saying the selected words and the portions of the response video data that include the person saying the selected words matching portions of the reference video data that include the selected words.

9. The system of claim 1, wherein when executed by the processor the identity verification module causes the verification device to generate the identification pair by:

receiving image data of an identification card and parsing a card facial image and text from the identification card based on the image data;

generating and storing the identifier based on the text parsed from the identification card;

input live facial image data of the person using a camera of the identity verification device;

determine if the live facial image data matches the card facial image; and inputting and storing the biometric data of the identification pair based on the live facial image matching the facial image.

10. The system of claim 1, wherein the verification device is a server and the identity verification module is a part of a website operated by the server.

11. The system of claim 1, wherein the verification device is a local device and the identity verification module is a part of an application downloaded onto the local device.

12. A dynamic biometric identity verification device for verifying an identity of a person, the person associated with an identification pair stored on a biometric data memory and including an identifier and biometric data of the person, the biometric data including reference audio data of the person saying a list of one or more of a plurality of target words, the device comprising:

a processor;

a microphone;

a display; and a non-transitory computer-readable device memory storing an identity verification module that when executed by the processor causes the identity verification device to:

generate a graphical user interface on the verification device, the graphical user interface including a receiving function, an access function, a selection function, a determining function and a verification function, wherein the receiving function is configured to receive an identification request from the person, the identification request indicating the identifier of the person; wherein the access function is configured to access the biometric data memory and identify the biometric data of the person based on the identifier of the person indicated by the identification request; wherein the selection function is configured to select one or more selected words of the list; and further wherein the determining function is configured to determine a selected challenge question based on the selected words, the selected challenge question having a correct answer and at least one of the selected challenge question and the correct answer including the selected words;

generate and output one or more of at least one digital image and digital audio signal with the verification device, the one or more of the at least one digital image and the digital audio signal indicating the selected challenge question; and store response audio data input by the microphone on the non-transitory computer-readable memory, the response audio data being in response to the selected challenge question;

wherein the verification function is configured to indicate that the person corresponds to the identifier based on: the response audio data including the selected words and portions of the response audio data that include the selected words matching portions of the reference audio data that include the selected words; and the response audio data including the correct answer.

13. The device of claim 12, further comprising a non-transitory computer-readable challenge repository storing a plurality of challenge questions including the selected challenge question, wherein the challenge questions are each paired with one or more answers, wherein each of the challenge questions has at least one characteristic of a group of characteristics comprising:

the challenge question comprises one or more of the target words; and the answers to the challenge question comprise one or more of the target words.

14. The device of claim 13, wherein each of the answers is a sentence including the one or more of the target words.

15. The device of claim 13, wherein the selected challenge question is a fill in a blank question with the blank being one of the selected words.

16. The device of claim 12, wherein when executed by the processor the identity verification module causes the verification device to begin a timer when presenting the selected challenge question to the person and indicate that the identity of the person could not be verified if the response audio data is received after a predetermined amount of time has elapsed since the timer was began.

17. The device of claim 12, wherein when executed by the processor the identity verification module causes the verification device to:

remove the selected words from the list after the selected words have been used to verify if the person corresponds to the identifier;

based on determining that the person corresponds to the identifier, add to the list one or more words forming the correct answer in the response audio data that are not the selected words; and store parts of the response audio data including the one or more words added to the list in the biometric data memory with the reference audio data of the person.

18. The device of claim 12, wherein the biometric data includes reference video data of the person saying the list of one or more of the plurality of target words.

19. The device of claim 18, wherein when executed by the processor the identity verification module causes the verification device to receive response video data in response to the selected challenge question, and further wherein the indicating that the person corresponds to the identifier is also based on:

the response video data including the person saying the selected words and the portions of the response video data that include the person saying the selected words matching portions of the reference video data that include the selected words.

20. The device of claim 12, wherein when executed by the processor the identity verification module causes the verification device to generate the identification pair by:

receiving image data of an identification card and parsing a card facial image and text from the identification card based on the image data;

generating and storing the identifier based on the text parsed from the identification card;

input live facial image data of the person using a camera of the identity verification device;

determine if the live facial image data matches the card facial image; and inputting and storing the biometric data of the identification pair based on the live facial image matching the facial image.

21. The device of claim 12, wherein the device memory comprises the biometric data memory and the identity verification module is a part of a website.

22. The device of claim 12, further comprising a display that displays the selected challenge question, a microphone that receives the response audio data and a camera for receiving live facial image data.

23. A method of verifying an identity of a person, the method comprising:

generating a graphical user interface with a verification device having a microphone, a display, a processor and a non-transitory computer-readable memory, the graphical user interface including a receiving function, an access function, an identifying function, a selection function, a determining function and a verification function, wherein the receiving function enables receiving an identification request from the person with a verification device, the identification request indicating the identifier of the person; wherein the access function enables accessing biometric data memory with the identity verification device, the biometric data memory storing an identification pair including an identifier and biometric data of the person, the biometric data including reference audio data of the person saying a list of one or more of a plurality of target words; wherein the identifying function enables identifying the biometric data of the person with the identity verification device based on the identifier of the person indicated by the identification request; wherein the selecting function enables selecting one or more selected words of the list with the identity verification device; and further wherein the determining function enables determining a selected challenge question with the identity verification device based on the selected words, the selected challenge question having a correct answer and at least one of the selected challenge question and the correct answer including the selected words;

generating and outputting one or more of at least one digital image and digital audio signal with the verification device, the one or more of the at least one digital image and the digital audio signal indicating the selected challenge question; and storing response audio data input by the microphone on the non-transitory computer-readable memory with the identity verification device, the response audio data being in response to the selected challenge question;

wherein the verification function enables indicating with the identity verification device that the person corresponds to the identifier based on: the response audio data including the selected words and portions of the response audio data that include the selected words matching portions of the reference audio data that include the selected words; and the response audio data including the correct answer.

24. The method of claim 23, further comprising accessing a non-transitory computer-readable challenge repository with the identity verification device, the challenge repository storing a plurality of challenge questions including the selected challenge question, wherein the challenge questions are each paired with one or more answers, wherein each of the challenge questions has at least one characteristic of a group of characteristics comprising:
- the challenge question comprises one or more of the target words; and
- the answers to the challenge question comprise one or more of the target words.

25. The method of claim 24, wherein each of the answers is a sentence including the one or more of the target words.

26. The method of claim 24, wherein the selected challenge question is a fill in a blank question with the blank being one of the selected words.

27. The method of claim 23, further comprising beginning a timer with the identity verification device when presenting the selected challenge question to the person and indicating with the identity verification device that the identity of the person could not be verified if the response audio data is received after a predetermined amount of time has elapsed since the timer was began.

28. The method of claim 23, further comprising:
- removing the selected words from the list with the identity verification device after the selected words have been used to verify if the person corresponds to the identifier;
- based on determining that the person corresponds to the identifier, adding to the list with the identity verification device one or more words forming the correct answer in the response audio data that are not the selected words; and
- storing with the identity verification device parts of the response audio data including the one more words added to the list in the biometric data memory with the reference audio data of the person.

29. The method of claim 23, wherein the biometric data includes reference video data of the person saying the list of one or more of the plurality of target words.

30. The method of claim 29, further comprising receiving with the identity verification device response video data in response to the selected challenge question, wherein the indicating that the person corresponds to the identifier is also based on:
- the response video data including the person saying the selected words and the portions of the response video data that include the person saying the selected words matching portions of the reference video data that include the selected words.

31. The method of claim 23, further comprising generating the identification pair with the identity verification device by:
- receiving image data of an identification card and parsing a card facial image and text from the identification card based on the image data;
- generating and storing the identifier based on the text parsed from the identification card;
- input live facial image data of the person;
- determine if the live facial image data matches the card facial image; and
- inputting and storing the biometric data of the identification pair based on the live facial image matching the facial image.

32. The method of claim 23, wherein the identity verification device comprises the biometric data memory.

33. The method of claim 23, wherein the identity verification device displays the selected challenge question with an electronic display screen, receives the response audio data with a microphone and receives live facial image data with a camera.

34. The system of claim 1, wherein after determining that the person corresponds to the identifier, the verification function is configured to grant access to previously locked services.

* * * * *